United States Patent [19]
Paugh

[11] 3,908,034
[45] Sept. 23, 1975

[54] CONTINUOUS PUFFING METHOD
[75] Inventor: George W. Paugh, St. Louis, Mo.
[73] Assignee: Ralston Purina Company, St. Louis, Mo.
[22] Filed: July 20, 1973
[21] Appl. No.: 381,124

Related U.S. Application Data
[63] Continuation-in-part of Ser. No. 188,383, Oct. 12, 1971, Pat. No. 3,764,343.

[52] U.S. Cl. .................. 426/449; 99/237; 426/511
[51] Int. Cl.² ........................................... A23L 1/18
[58] Field of Search .......... 426/351, 510, 508, 352, 426/447, 448, 449, 461, 462, 511

[56] References Cited
UNITED STATES PATENTS
2,622,985  12/1952  Haughey et al. .................. 426/449
2,698,799  1/1955   Rupp et al. ........................ 426/449
2,766,120  10/1956  Reinhart ........................... 426/449

Primary Examiner—Raymond N. Jones
Attorney, Agent, or Firm—W. Dennis Drehkoff; Virgil B. Hill; Lawrence J. Hurst

[57] ABSTRACT

Food or raw grain materials are metered to conveying compartments or chambers formed between a plurality of conveying members in a puffer barrel. Steam at a pressure in the range of about 300 psig is supplied to the food in the chambers as it is being conveyed. The conveying members then pass out of fluid pressure sealing engagement with the puffer barrel to release the pressure in the conveying compartment or chamber and permit the puffing of the food product contained therein.

3 Claims, 4 Drawing Figures

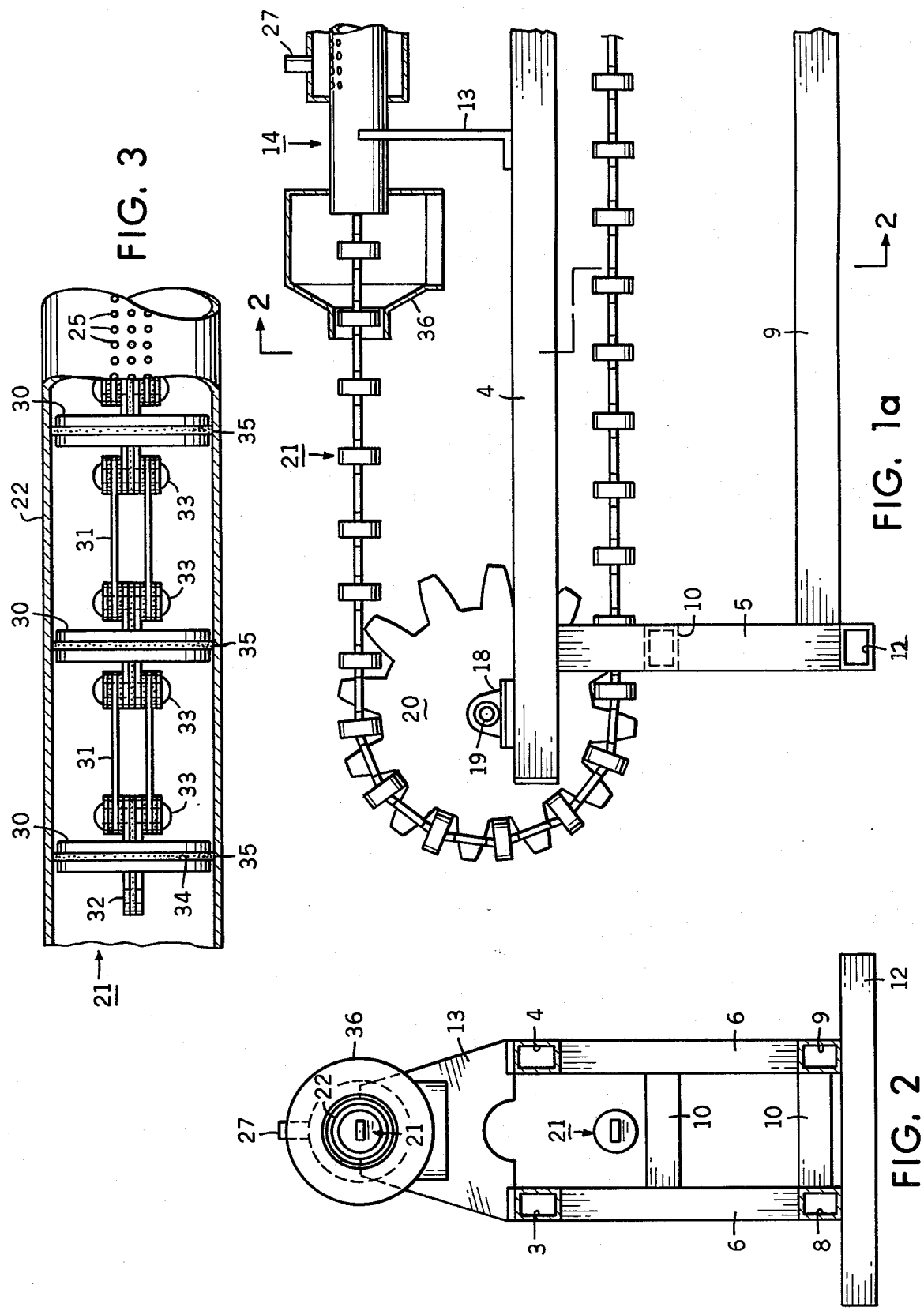

CONTINUOUS PUFFING METHOD

BACKGROUND OF THE INVENTION

This application is a continuation-in-part application of my co-pending application Ser. No. 188,383 filed Oct. 12, 1971 now U.S. Pat. No. 3,764,343.

The present invention is directed to a continuous operating apparatus for puffing materials such as grain, fruits, or vegetables. Primarily, the problem solved by the present apparatus is that it enables the operator to continuously and rapidly process food materials in a manner and at considerable pressures such as 300 psig with a small capital investment. Applicant has found that by providing product cavities or chambers between pistons of a continuously moving conveyor which are passed through a cylinder into a high pressure zone and thereafter into the atmosphere it is possible to achieve the continuous puffing of materials very rapidly.

Generally, food products may be puffed by utilizing one of three different known types of puffers. The first of these known prior art devices is commonly called a puffing gun. In the operation of gun puffing a pressure vessel is utilized which is equipped with a quick opening door. The pressure vessel is loaded with material, the pressure within the vessel is then allowed to build to the desired pressure range, normally 200 to 300 psi and thereafter the door is opened quickly to achieve the quick pressure release and allow the food product to puff. As is obvious, when utilizing such equipment, it is normally a batch operation which requires considerable time for the loading and unloading of the material and also requires a considerable period of time to obtain the desired pressure build-up of the 200 – 300 psi.

The second type of known prior art device used for puffing food products is the reciprocating piston gun. In such apparatus a reciprocating piston is utilized to push product into a pressure vessel which then establishes a pressure on the food product at the desired level and a second piston is then utilized to release the pressure on the product in the vessel at the desired time to obtain the puffed product. Such apparatus and methods do not readily lend themselves to large volume production and do not permit the rapid and continuous operation in the manner that is desired by applicant.

The third type of apparatus which may be utilized to achieve a puffing of the final product is commonly called the restricted orifice method and apparatus. In this type of apparatus material is fed into a pressure vessel using a multiple rotary feeder (such as a rotary valve or starwheel). Material is conveyed to the discharge end of the pressure vessel by means of a screw conveyor. The discharge orifice of the pressure vessel is very small compared to the steam inlet and the material inlet. A large volume of high pressure steam is injected into the pressure vessel and since the discharge orifice is predeterminately small there is a pressure build-up within the vessel. As the material is then moved through the discharge orifice, it is propelled through the orifice by the escaping steam pressure which establishes the desired pressure drop and permits the food material to puff or expand.

SUMMARY OF THE INVENTION

It is therefore the principal object of the present invention to provide apparatus and a method for continuously puffing grain or other food products.

Another object of the present invention is to provide a unique conveying member and puffer barrel arrangement which enables grain to be fed and discharged from the puffer barrel on a continuous basis without substantial loss of pressure.

Another object of the present invention is to provide apparatus having an endless conveyor having a plurality of pistons thereon, a puffer barrel surrounding a portion of the conveyor with the pistons defining therebetween and with the puffer barrel a plurality of conveying compartments for maintaining a predetermined pressure therein, a pressure housing is provided about a portion of the puffer barrel and is connected to a source of steam, the puffer barrel interiorly of the pressure housing having a plurality of openings therein to permit the steam to be supplied to the chamber and the food product and when the pistons move out of food pressure sealing engagement with the puffer barrel the pressure in the chamber is released exposing the food products to substantially lower pressure which permits the puffing of the food products.

Briefly, one aspect of the present invention comprises apparatus having an endless conveyor belt including a plurality of conveying members thereon, a puffer barrel about a portion of said conveyor, the conveying members forming a fluid pressure seal with the puffer barrel to define chambers for carrying the food product, an inlet on the puffer barrel for supplying the food product to the formed chambers, a pressure housing surrounding a portion of the puffer barrel and connected to a source of steam, the puffer barrel interiorly of the pressure housing having a plurality of holes therein for permitting the steam to be supplied to the formed chambers, and the pistons passing out of sealing engagement with the puffer barrel to release the pressure in the chambers and permit the puffing of the food product.

Another aspect of the present invention comprises the method of continuously puffing food products under pressure wherein the food product is metered into conveyor compartments formed by the pistons on the conveyor establishing a fluid pressure seal with the puffer barrel to substantially prevent the loss of pressure therefrom, supplying steam to the food products as it is moved from the inlet to the outlet of the puffer barrel and releasing the pressure and discharging the cooked food product by passing the pistons out of fluid pressure sealing engagement with the puffer barrel.

BRIEF DESCRIPTION OF THE DRAWINGS

In the drawings wherein like numerals refer to like parts:

FIGS. 1a and 1b are a side view of the continuous puffer having portions thereof broken away;

FIG. 2 is a sectional view of the apparatus of FIG. 1 taken along the line 2 — 2, with the deflector member removed; and FIG. 3 is a partially broken away side view of the endless conveyor inside of a portion of the puffer barrel.

DESCRIPTION OF THE PREFERRED EMBODIMENTS

Figure 1B:
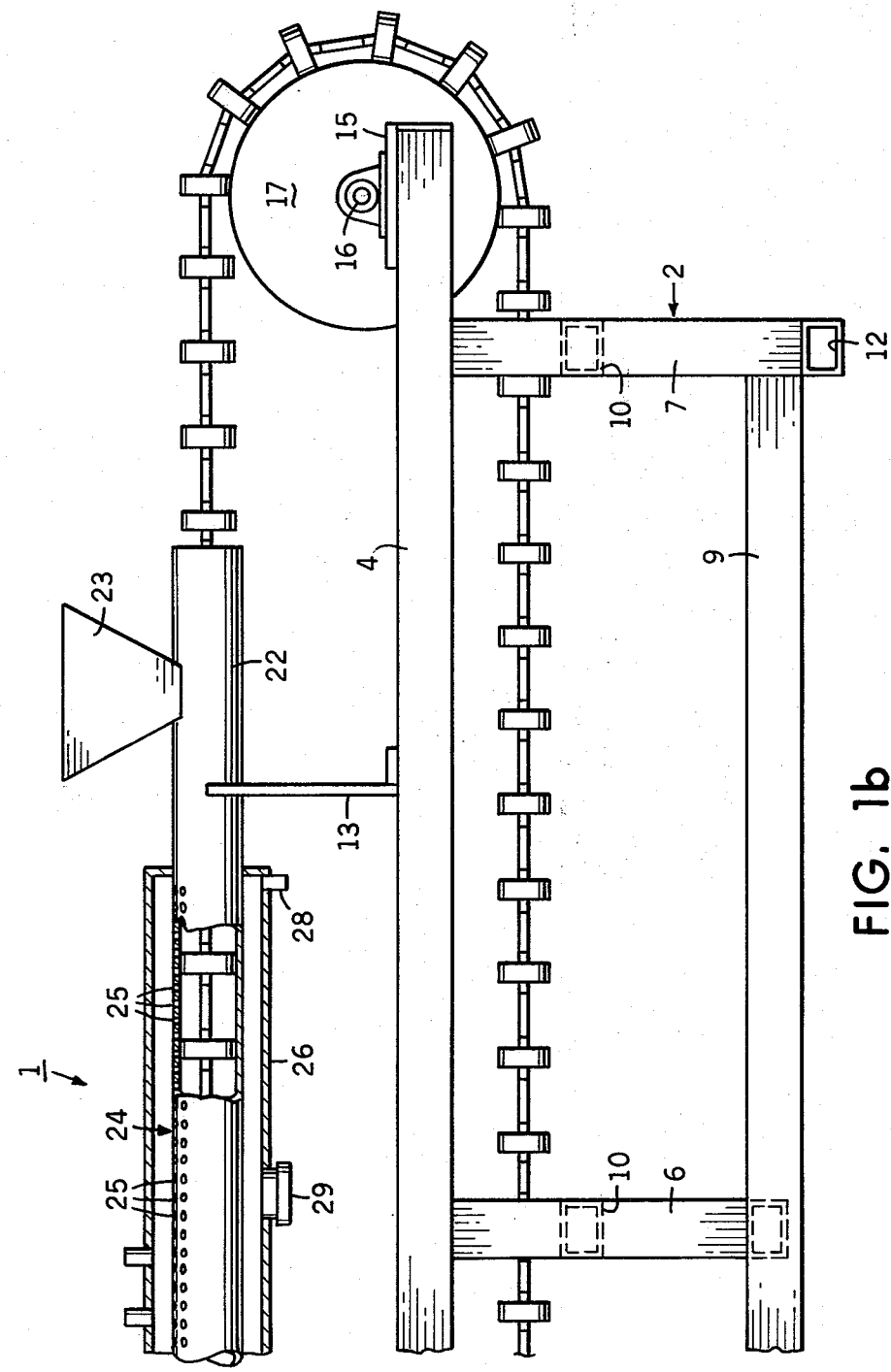

Referring now to FIGS. 1a, 1b and 2 the continuous puffer apparatus 1 is provided with a frame, indicated generally at 2, having a pair of horizontal support members 3, 4 which are connected to the vertical legs 5, 6 and 7. Another pair of horizontal members 8 and 9 are connected to the lower portions of the legs 5, 6 and 7. The legs 5, 6 and 7 are connected by cross braces 10 and the legs 5 and 7 are connected to base members 12.

Vertically extending brace members 13 are provided on the horizontal support members 3 and 4 for supporting the puffer barrel assembly, indicated generally at 14.

A pair of mounting brackets and bearings 15 are provided on the rightward end (as viewed in FIG. 1a and 1b) of the horizontal support members 3 and 4 and receive a shaft 16 therein having an idler sprocket 17 thereon. Another pair of mounting brackets and bearings 18 are provided on the leftward end (as viewed in FIG. 1a and 1b) of the horizontal support members 3 and 4. A shaft 19 is provided in the brackets and bearings 18 and has a drive sprocket 20 thereon. The shaft 19 is connected to a commercially available drive unit (not shown) for driving the sprocket 20 at a given rate of speed and essentially consists of a motor and gear reducer. An endless conveyor, indicated generally at 21, passes around the sprockets 20 and 17 and is driven by the sprocket 20.

The puffer barrel assembly 14 consists of an elongated puffer barrel member 22 which is supported by the brackets 13. A food product inlet or funnel member 23 is connected to the inlet end of the puffer barrel 22 to permit the food product to be fed into the puffer barrel between the conveying members on the conveyor 21. A portion of the puffer barrel 22, indicated generally at 24, is provided with a plurality of openings 25. A pressure housing 26 is provided about the portion 24 of the puffer barrel 22 and is in fluid pressure sealing engagement with the outer periphery of the puffer barrel 22 to form a pressure chamber about the portion 24 of the puffer barrel 22. The pressure housing 26 is provided with inlets 27 connected to a steam source (not shown) and an outlet 28 to permit the discharge of condensate from the pressure housing. It should be understood that steam supplied to the pressure housing 26 will be able to enter the puffer barrel 22 through the openings 25 in the puffer barrel portion 24. The openings 25 permit the introduction of the steam into the formed chambers between the conveying members on the conveyor 21 substantially without forcing the food product out of the openings 25. The size and number of openings 25 to be provided in the puffer barrel will be dependent on the operator's preference for obtaining and maintaining the desired pressure on the food product during its passage through the puffer barrel 22. A plug or removable member 29 may be provided on the pressure housing 26 to permit the cleaning of the pressure housing.

Referring more particularly to FIG. 3, the conveyor 21 consists of individual conveying members or disks 30 which are pivotally connected by means of a chain link 31. The sprockets 17 and 20 readily receive the conveying disks 30 and permits the conveyor 21 to be driven in a positive manner by the drive unit. Desirably, the disks or conveying members are constructed of a stainless steel material having a connecting portion 32 which is formed within the disk and which are connected to the chain link 31 in a pivotal manner by pins 33. Such conveyors are well-known in the industry and are commercially available from suppliers such as Hapman Corporation. However, the conveying members 30 may be constructed of other materials which are resistant to the temperatures and pressures to be utilized within the puffer barrel 22. For instance when raw grain is the food being cooked, the steam pressure will be in the range of about 200 – 400 psi. The disks 30 should be mounted such that the conveyor is located at substantially the center of the disks. This central mounting of the disks permits the conveying members 30 to pass through the puffer barrel 22 without binding. It should be noted that each of the conveying members or disks 30 are provided with annular grooves 34 having a sealing member 35 therein for establishing a fluid pressure seal with the interior wall of the puffer barrel 22 as the conveying members 30 are passed therethrough.

A deflector member, indicated generally at 36, is provided adjacent the discharge or outlet end of the puffer barrel 22 about the conveyor 21 for directing or controlling the flow of the food product in a desired direction as the pressure is released and the food product expelled from between the adjacent conveying members 30. The food product will normally be blown clean from the conveying members 30 by the pressure release, however, if desired other means such as an air blast or wire brush may be provided for insuring that the food product does not remain attached to the conveying members.

In the operation of the puffer apparatus 1, the drive mechanism is energized which serves to move the endless conveyor 21 about the sprockets 17 and 20 and through the puffer barrel 22. Steam is supplied to the inlets 27 of the pressure housing 26 and therefrom through the openings 25 into the pressure barrel 22. A food product such as raw grain and particularly wheat is then fed through the inlet 23 where it is picked-up or received in the conveying compartments or chambers formed between the conveying members 30 and the puffer barrel 22. Due to the sealing engagement between the sealing members 35 on the pistons 30 and the puffer barrel 22, the adjacent pistons as they enter the inlet of the puffer barrel sequentially form a continuously moving pressure chamber. The food products in the formed chambers are then passed through the portion 24 of the puffer barrel 22 which permits the supply of steam to the chambers and the food products carried therein. The steam pressure utilized and the speed of the conveyor 21 may be controlled to obtain the desired puffing of the final product. The steam pressure utilized and the time at which the food product is subjected to this pressure will depend on the type of food product being processed and may be readily determined by the operator. Typically, the steam pressure will be in the range of 200 – 400 psi and the food product, such as grains or wheat, will be subjected to this pressure for about 15 – 60 seconds. As the pistons 30 on the conveyor 21 reach the discharge end of the puffer barrel 22, the fluid pressure seal between the piston and puffer barrel ceases, terminating the formed chambers and releasing the pressure on the food product to permit the puffing or expansion thereof. The diverter member 36 directs the puffed food product downwardly through the opening in the bottom thereof and in the proper direction for further processing.

The following is an example of the operation of the subject apparatus and process. In this example the ingredient used is wheat. The resultant product is puffed wheat.

The wheat is first steam heated to 190° F. by exposure to live steam, then placed in hopper or funnel 23 of the puffer 1. The moving conveyor 21 with pistons 30 pass through the puffer barrel 22 forming the continuously moving pressure chambers between the adjacent pistons. As the pistons 30 pass beneath the hopper 23, the wheat is picked up in the moving chambers and urged along by the pistons 30. The pistons 30 move the grain into the puffer barrel area 24 with the steam inlets 25 permitting steam to be introduced into the chambers. The grain is subjected to 300 psi steam pressure. The pistons 30 with their sealing members 35 forming a fluid pressure seal with the puffer barrel 21, prevent the loss of steam pressure. The grain is subjected to the steam pressure for 15 – 60 seconds, preferably 30 seconds, as the grain is moved to the outlet end of the puffer barrel 22. At the outlet the fluid pressure seal between the piston 30 and puffer barrel 22 is terminated permitting the pressure within the chamber to be released to atmosphere. This rapid change in pressure causes the grain to puff to a volume several times its original size.

In view of the foregoing, it is readily apparent that a novel machine and process is provided for continuously puffing food materials and that obvious modifications or changes in the exact configuration contained herein by way of example may be made without departing from the spirit of the invention which is defined by the claims which follow.

I claim:

1. A method of continuously puffing a food product comprising sequentially passing a plurality of conveying members through a puffer barrel, establishing a fluid pressure seal between each of said conveying members and said puffer barrel to form continuously moving chambers between adjacent conveying members and the puffer barrel, metering a food product into the continuously moving chambers, supplying steam to said chambers at a pressure and for a period of time sufficient to permit the puffing of the food product upon the release of the pressure and terminating said chamber to release the pressure therein and permit the food product to be puffed.

2. The method according to claim 1 wherein the pressure of the steam supplied to said chamber is in the range of 200 – 400 psi.

3. The method according to claim 2 wherein the food product is subjected to the steam pressure for a period of time in the range of 15 – 60 seconds.

* * * * *